(12) United States Patent
Ichida (10) Patent No.: US 6,287,228 B1
(45) Date of Patent: Sep. 11, 2001

(54) REAR DERAILLEUR WITH CABLE GUIDE ROLLER

(75) Inventor: Tadashi Ichida, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/439,224

(22) Filed: Nov. 12, 1999

(51) Int. Cl.[7] .................................................. F16H 9/00
(52) U.S. Cl. ................................................. 474/82; 474/80
(58) Field of Search ................... 474/80, 79, 69, 474/70, 82

(56) References Cited

U.S. PATENT DOCUMENTS

| | | | |
|---|---|---|---|
| 3,979,962 | 9/1976 | Kebsch | 74/217 B |
| 4,306,871 | 12/1981 | Nagano | 474/82 |
| 4,437,848 | * 3/1984 | Shimano | 474/82 |
| 4,470,823 | 9/1984 | Shimano | 474/82 |
| 5,421,786 | 6/1995 | Ando | 474/78 |
| 5,624,334 | 4/1997 | Lumpkin | 474/79 |
| 5,624,335 | 4/1997 | Ando | 474/80 |
| 5,904,629 | 5/1999 | Oka | 474/78 |

OTHER PUBLICATIONS

U.S. patent application No. 09/259,152; "Derailleur Cable Router With A Cable Housing Support That Pivots In Multiple Direction," Y.Y. Soon, Filed Feb. 26, 1999.

* cited by examiner

*Primary Examiner*—David A. Bucci
*Assistant Examiner*—Vicky A. Johnson
(74) *Attorney, Agent, or Firm*—James A. Deland (57) ABSTRACT

A bicycle derailleur assembly includes a base member, an intermediate member, and a movable member supporting a chain guide. The intermediate member is coupled to the base member for pivoting relative to the base member around a pivot area defining a pivot axis, and the movable member is coupled for movement relative to the intermediate member. A cable guide roller having a cable guide surface is provided to the derailleur assembly, wherein the cable guide surface intersects the pivot area when viewed in a direction of the pivot axis.

30 Claims, 11 Drawing Sheets

REAR DERAILLEUR WITH CABLE GUIDE ROLLER

BACKGROUND OF THE INVENTION

The present invention is directed to control devices for bicycle transmissions and, more particularly, to a bicycle rear derailleur with a roller for guiding a control wire.

Rear derailleurs are commonly used on bicycles to move a chain from one rear wheel sprocket to another rear wheel sprocket so as to change the speed stage of the bicycle transmission. A typical rear derailleur includes a base member that attaches to the bicycle frame and a movable member supporting a chain guide, wherein the movable member is coupled to the base member through a link mechanism. The movable member moves relative to the base member so that the chain guide guides the chain from one sprocket to another. A control cable of the type having an inner wire that slides within an outer casing often is used to control the derailleur. Usually, the outer casing is fastened to the base member and the inner wire is fastened to the link mechanism so that pulling and releasing the inner wire (using a shift control device mounted to the handlebar) applies a force to the link mechanism. This, in turn, causes the movable member and chain guide to move back and forth to align the chain with a selected sprocket.

The control cable usually is mounted to the rear of the derailleur such that the inner wire extends forwardly to the link mechanism. As a result, the control cable must bend significantly as it travels from the handlebar mounted shift control device to the derailleur. This creates significant friction between the inner wire and outer casing of the control cable which, in turn, adversely affects the operation of the derailleur. Some derailleurs include a cable guide pin or roller as shown in U.S. Pat. Nos. 3,979,962; 4,306,871 and 4,470,823 to change the direction of the inner wire at the derailleur. While these solutions work well when the derailleur base member is rigidly fixed to the bicycle frame, they do not work as well when the base member is pivotably connected to the bicycle frame. For example, such pivoting rear derailleurs often are used in conjunction with a front derailleur that switches the chain between multiple front sprockets attached to the pedals. When the front derailleur switches the chain from one front sprocket to another, the resulting variation in tension on the chain causes the base member of the rear derailleur to pivot. Since the pivot axis of the base member is usually spaced apart from the cable guide pin or roller, the pivoting base member causes the tension on the inner wire of the control cable to change. This, in turn, causes the movable member to move laterally inwardly or outwardly relative to the base member, thus adversely affecting the proper alignment of the chain guide with the selected rear sprocket.

SUMMARY OF THE INVENTION

The preset invention is directed to a rear derailleur which can significantly change the routing direction of a control cable used to operate the derailleur without adversely affecting the tension on the control cable when the derailleur pivots relative to the bicycle frame. In one embodiment of the present invention, a bicycle derailleur assembly includes a base member, an intermediate member, and a movable member supporting a chain guide. The intermediate member is coupled to the base member for pivoting relative to the base member around a pivot area defining a pivot axis, and the movable member is coupled for movement relative to the intermediate member. A cable guide roller having a cable guide surface is provided to the derailleur assembly, wherein the cable guide surface intersects the pivot area when viewed in a direction of the pivot axis. Thus, when the derailleur pivots around the pivot axis, the inner wire can wind or unwind around the cable guide surface of the cable guide roller with little, if any, change in tension on the inner wire.

The cable guide roller may be mounted either to the base member or to the intermediate member as long as the cable guide surface intersects the pivot area when viewed in the direction of the pivot axis. If desired, a cable feed channel may be formed on the intermediate member to guide the cable to the linkage mechanism and to prevent possible cable derailment from the cable guide roller under severe operating conditions.

DETAILED DESCRIPTION OF THE EMBODIMENTS

Figure 1:
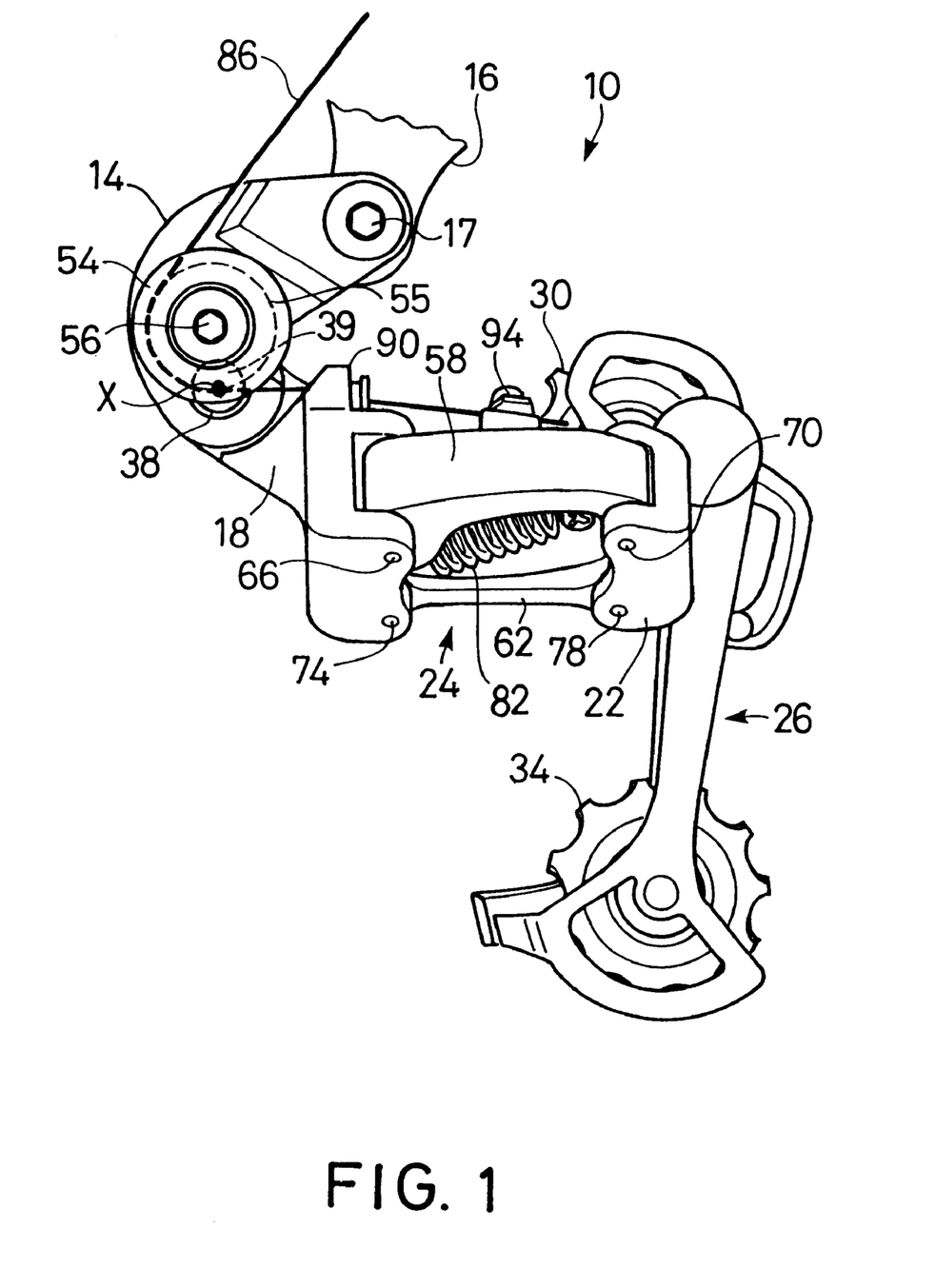
FIG. 1 is a laterally outer side view of a particular embodiment of a rear derailleur according to the present invention.
Figure 2:
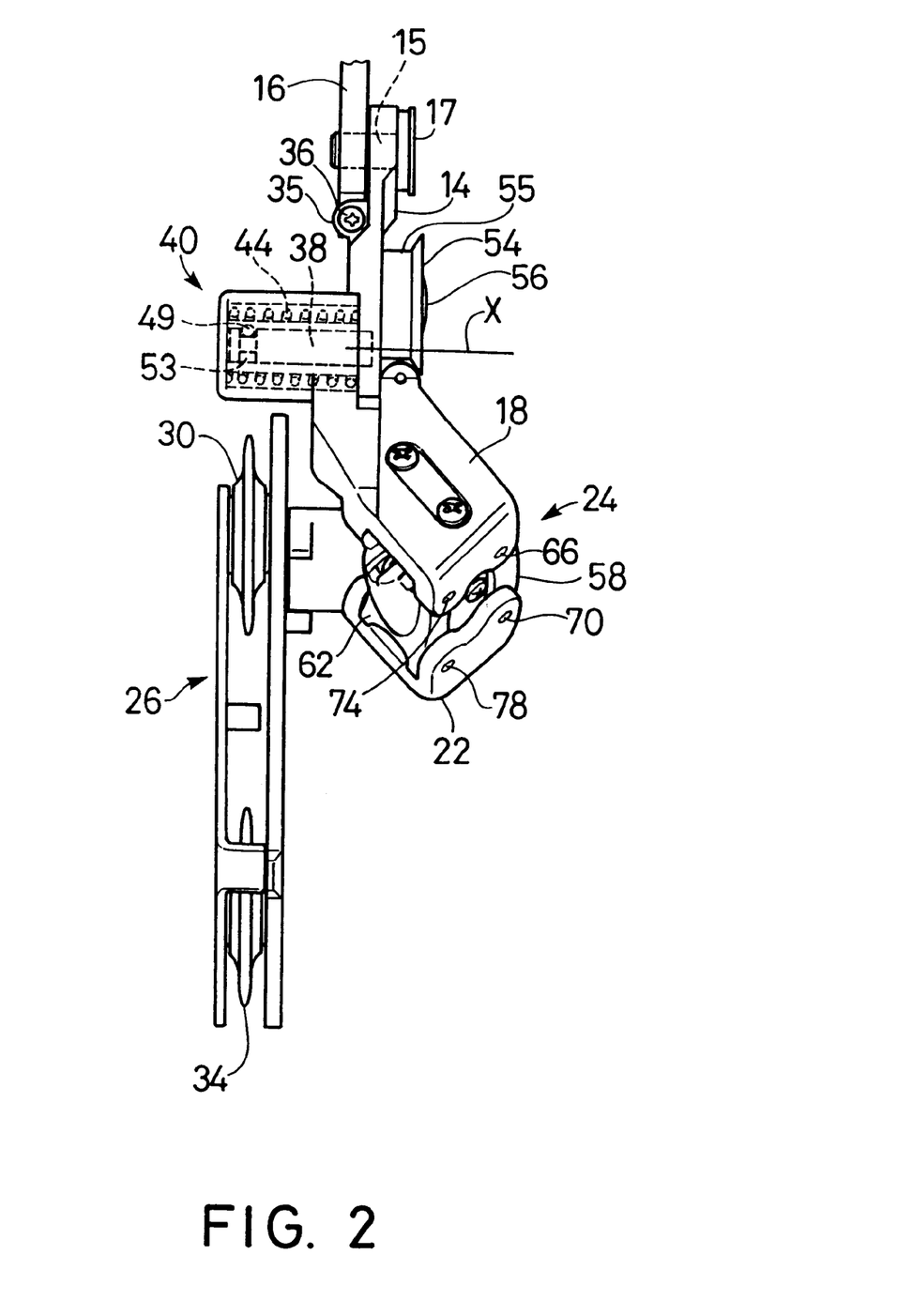
FIG. 2 is a rear view of the derailleur shown in FIG. 1.

FIG. 1 is a laterally outer side view of a particular embodiment of a rear derailleur according to the present invention, and FIG. 2 is a rear view of derailleur 10. As used herein, the terms "inner," "outer," "upper," "lower," "front" and "rear" are to be interpreted according to FIGS. 1 and 2, wherein the front side of derailleur 10 is to the right in FIG. 1, the rear side of derailleur 10 is to the left in FIG. 1, the outer side of derailleur 10 is to the right in FIG. 2, and the inner side of derailleur 10 is to the left in FIG. 2.

As shown in FIGS. 1 and 2, derailleur 10 includes a base member 14 with an opening 15 for mounting derailleur 10 to a rear portion of a bicycle frame 16 through a mounting bolt 17, an intermediate member 18, a movable member 22 coupled to intermediate member 18 through a linkage mechanism 24, and a chain guide 26 pivotably coupled to movable member 22 through a conventional pivot shaft (not shown) and spring (not shown). Chain guide 26 includes a conventional guide pulley 30 and tension pulley 34 for supporting a chain (not shown) in a conventional manner.

Figure 3:
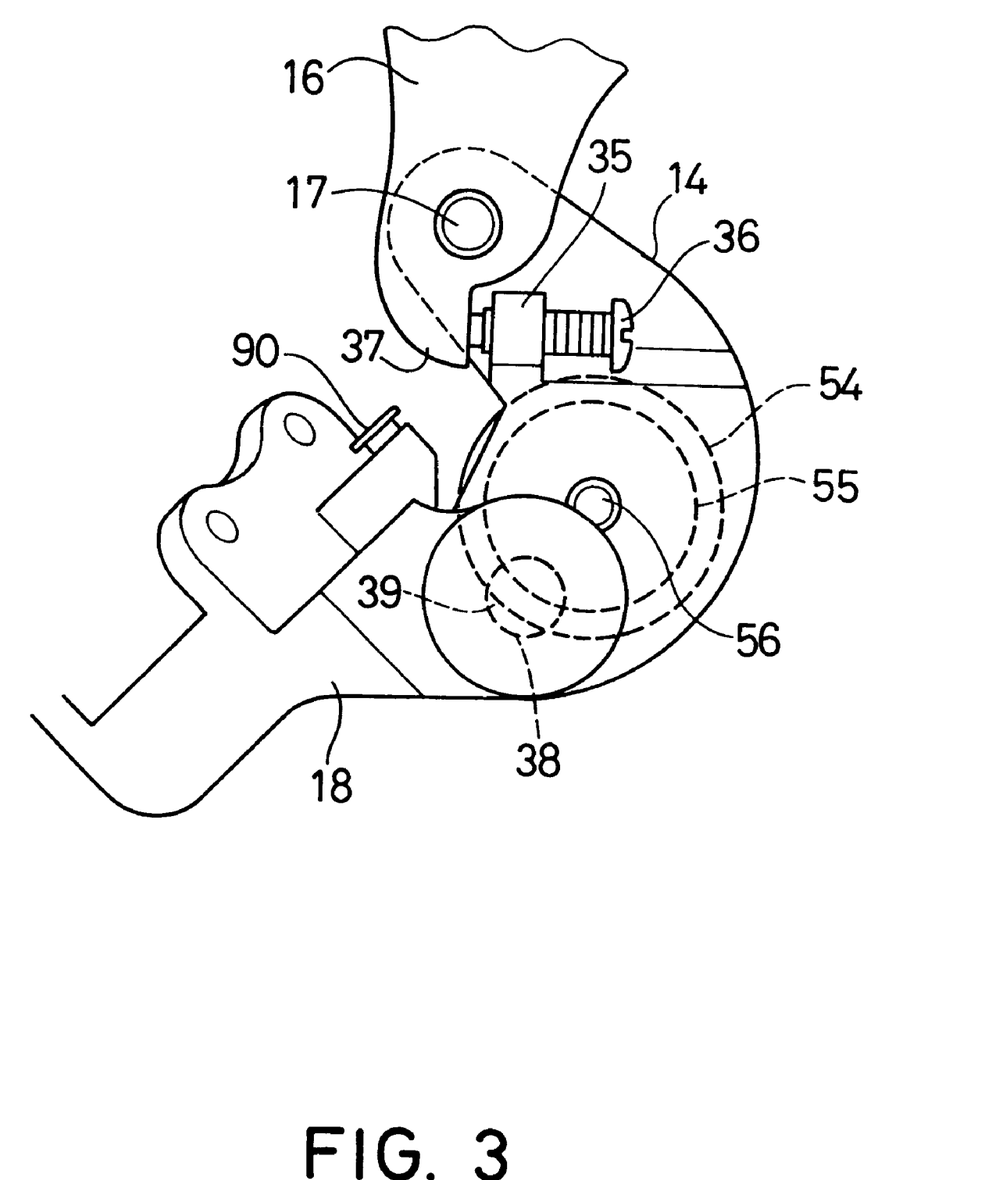
FIG. 3 is a laterally inner view of the base member and intermediate member of the derailleur shown in FIG. 1 showing an adjustment mechanism for adjusting a rotational position of the base member relative to the bicycle frame.

As shown in FIG. 3, base member 14 includes a positioning nose 35 that threadingly supports a position adjusting screw 36. The end of position adjusting screw 36 is adapted to abut against a positioning projection 37 formed on frame 16. The rotational position of base member 14 relative to frame 16 thus may be adjusted by rotating adjusting screw 36.

As shown more specifically in FIGS. 1–4, intermediate member 18 is coupled to base member 14 through a pivot shaft 38 so that intermediate member 18 pivots relative to base member 14 around a pivot area 39. Pivot area 39 is defined by the cross-sectional area of pivot shaft 38 when viewed in the direction of a pivot axis X which, in turn, is the concentric longitudinal axis of pivot shaft 38.

Figure 4:
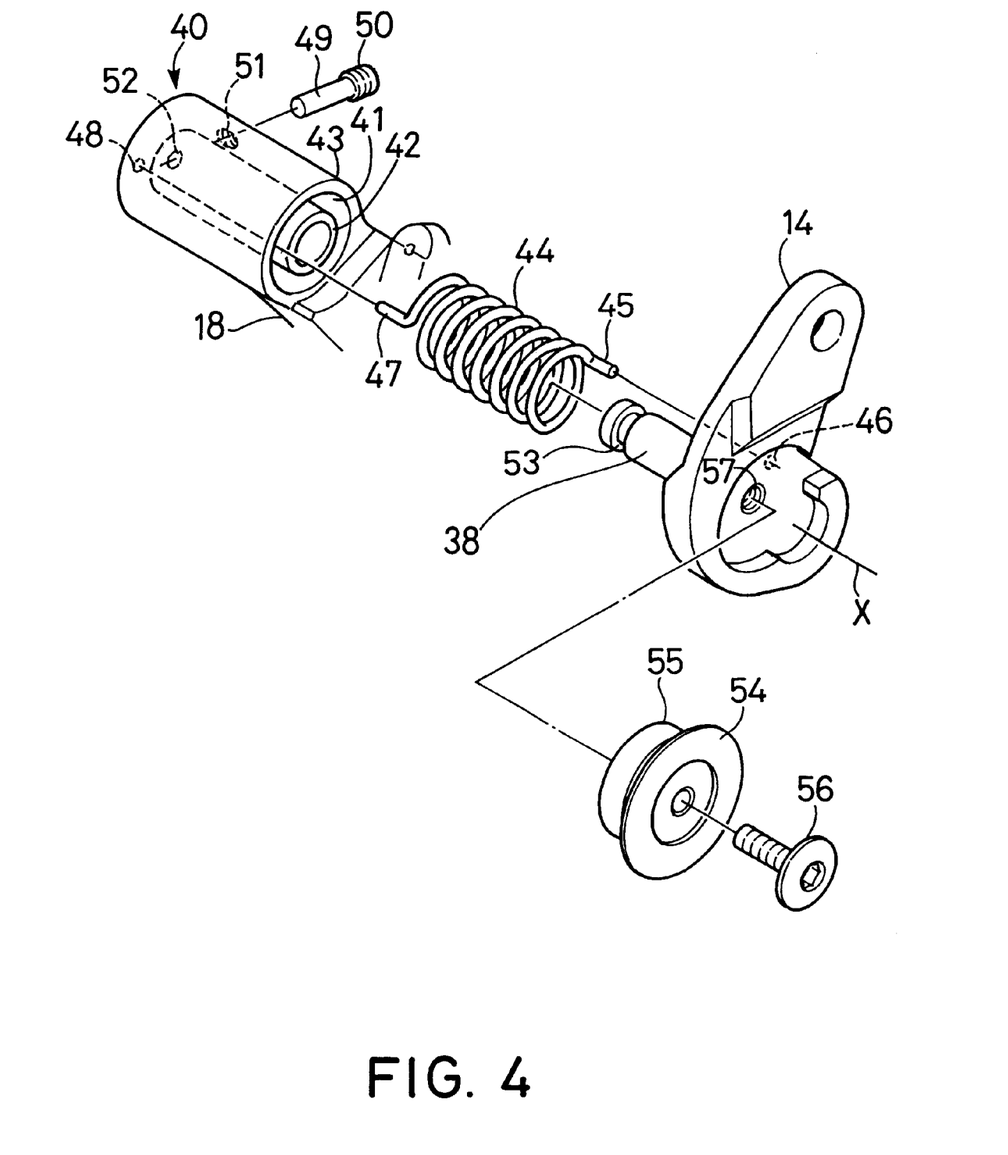
FIG. 4 is an exploded view of the base member, the intermediate member, the cable guide roller and a spring used to bias the intermediate member relative to the base member.

Intermediate member 18 includes a spring retaining housing 40 with an annular spring retaining bore 41 defined by an outer surface of a cylindrical shaft retaining housing 42 and an inner surface of an outer cylindrical portion 43 of spring retaining housing 40. A coil spring 44 has a first end 45 retained in an opening 46 in base member 14 and a second end 47 retained in an opening 48 in spring retaining housing 40. Thus, spring 44 functions as a biasing mechanism for biasing intermediate member 18 counterclockwise relative to base member 14. A shaft retaining bolt 49 with a threaded outer peripheral surface 50 screws into a threaded opening 51 in outer cylindrical portion 43, extends through openings 52 in shaft retaining housing 42 (only one opening is shown in FIG. 4), and engages a peripheral groove 53 in pivot shaft 38 for retaining pivot shaft 38 and base member 14 to intermediate member 18 in a rotatable but axially immovable manner. Spring retaining housing 40 is disposed on the inner side of base member 14 and extends laterally inward towards the rear wheel of the bicycle. This provides a derailleur that has fewer laterally outwardly projecting structures that can become damaged in a fall or collision.

A cable guide roller 54 having a cable guide surface 55 is rotatably mounted to the outer side of base member 14 through a bolt 56 that screws into a threaded opening 57 in base member 14. Cable guide surface 55 intersects pivot area 39, and more specifically pivot axis X when viewed in the direction of pivot axis X.

Linkage mechanism 24 includes an outer first link 58 and an inner second link 62. A first end of first link 58 is pivotably coupled to intermediate member 18 through a pivot shaft 66, and a second end of first link 58 is pivotably coupled to movable member 22 through a pivot shaft 70. Similarly, a first end of second link 62 is pivotably coupled to intermediate member 18 through a pivot shaft 74, and a second end of second link 62 is pivotably coupled to movable member 22 through a pivot shaft 78. This structure forms a parallelogram linkage mechanism. A return spring 82 is connected within linkage mechanism 24 between intermediate member 18 and movable member 22 for biasing movable member 22 laterally inward relative to intermediate member 18 (i.e., toward the rear wheel of the bicycle).

A control cable wire 86 originating from the front of the bicycle extends toward the rear of derailleur 10 and then changes direction by wrapping around cable guide surface 55 of cable guide roller 54 and extending forwardly through a cylindrical cable feed channel 90 formed on an upper inner portion of intermediate member 18. Wire 86 then is fastened to a wire fixing member 94 extending upwardly from on an inner side of second link 62 (in a manner similar to wire fixing member 94' in the embodiment shown in FIG. 6).

Figure 5A:
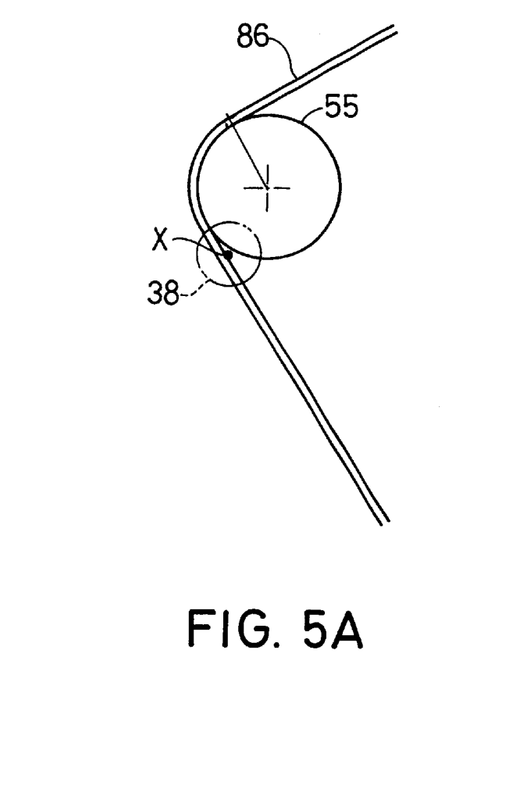
FIGS. 5A–5C illustrate the position of the inner wire of the control cable as the intermediate member pivots relative to the base member.
Figure 5B:
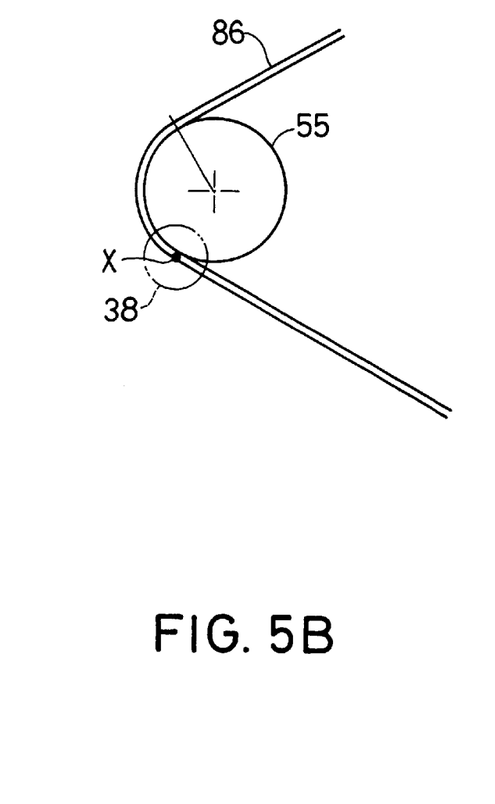
Figure 5C:
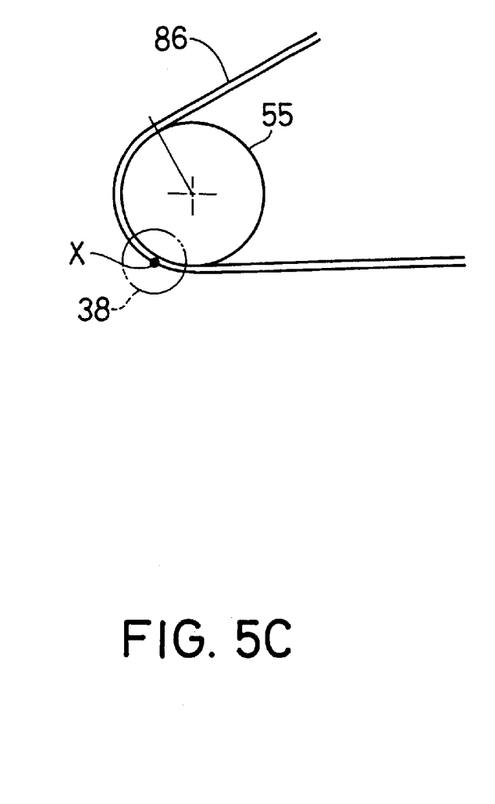

FIGS. 5A–5C illustrate the position of the control cable wire 86 as intermediate member 18 pivots relative to base member 14 in a counterclockwise direction. In general, the ideal condition is to have the center of control cable wire 86 intersect pivot area 39 and, more specifically, pivot axis X. FIG. 5A illustrates the situation where the chain engages the smallest (innermost) front sprocket in a three-sprocket cluster and control cable wire 86 slightly intersects pivot axis X; FIG. 5B shows the situation wherein the chain engages the middle front sprocket and the center of control cable wire 86 intersects pivot axis X at the initial contact point between control cable wire 86 and cable guide surface 55; and FIG. 5C shows the situation where the chain engages the largest (outermost) front sprocket and control cable wire 86 continues to intersect pivot axis X. As intermediate member 18 pivots relative to base member 14, wire 86 wraps around cable guide surface 55 to prevent a significant change in effective length of or tension in wire 86. This ensures that the alignment between chain guide 26 and the selected rear sprocket will not be adversely affected when the front derailleur shifts the chain to a different front sprocket. In tests conducted by the inventor, the effective length of wire 86 changed only 0.06 millimeter between the position shown in FIG. 5A and the position shown in Figure 5B, and the effective length of wire 86 changed only 0.118 millimeter between the position shown in FIG. 5B and the position shown in FIG. 5C.

FIGS. 5A–5C illustrate the position of the control cable wire 86 as intermediate member 18 pivots relative to base member 14 in a counterclockwise direction. In general, the ideal condition is to have the center of control cable wire 86 intersect pivot area 38 and, more specifically, pivot axis X. FIG. 5A illustrates the situation where the chain engages the smallest (innermost) front sprocket in a three-sprocket cluster and control cable wire 86 slightly intersects pivot axis X; FIG. 5B shows the situation wherein the chain engages the middle front sprocket and the center of control cable wire 86 intersects pivot axis X at the initial contact point between control cable wire 86 and cable guide surface 55; and FIG. 5C shows the situation where the chain engages the largest (outermost) front sprocket and control cable wire 86 continues to intersect pivot axis X. As intermediate member 18 pivots relative to base member 14, wire 86 wraps around cable guide surface 55 to prevent a significant change in effective length of or tension in wire 86. This ensures that the alignment between chain guide 26 and the selected rear sprocket will not be adversely affected when the front derailleur shifts the chain to a different front sprocket. In tests conducted by the inventor, the effective length of wire 86 changed only 0.06 millimeter between the position shown in FIG. 5A and the position shown in Figure 5B, and the effective length of wire 86 changed only 0.118 millimeter between the position shown in FIG. 5B and the position shown in FIG. 5C.

Figure 6:
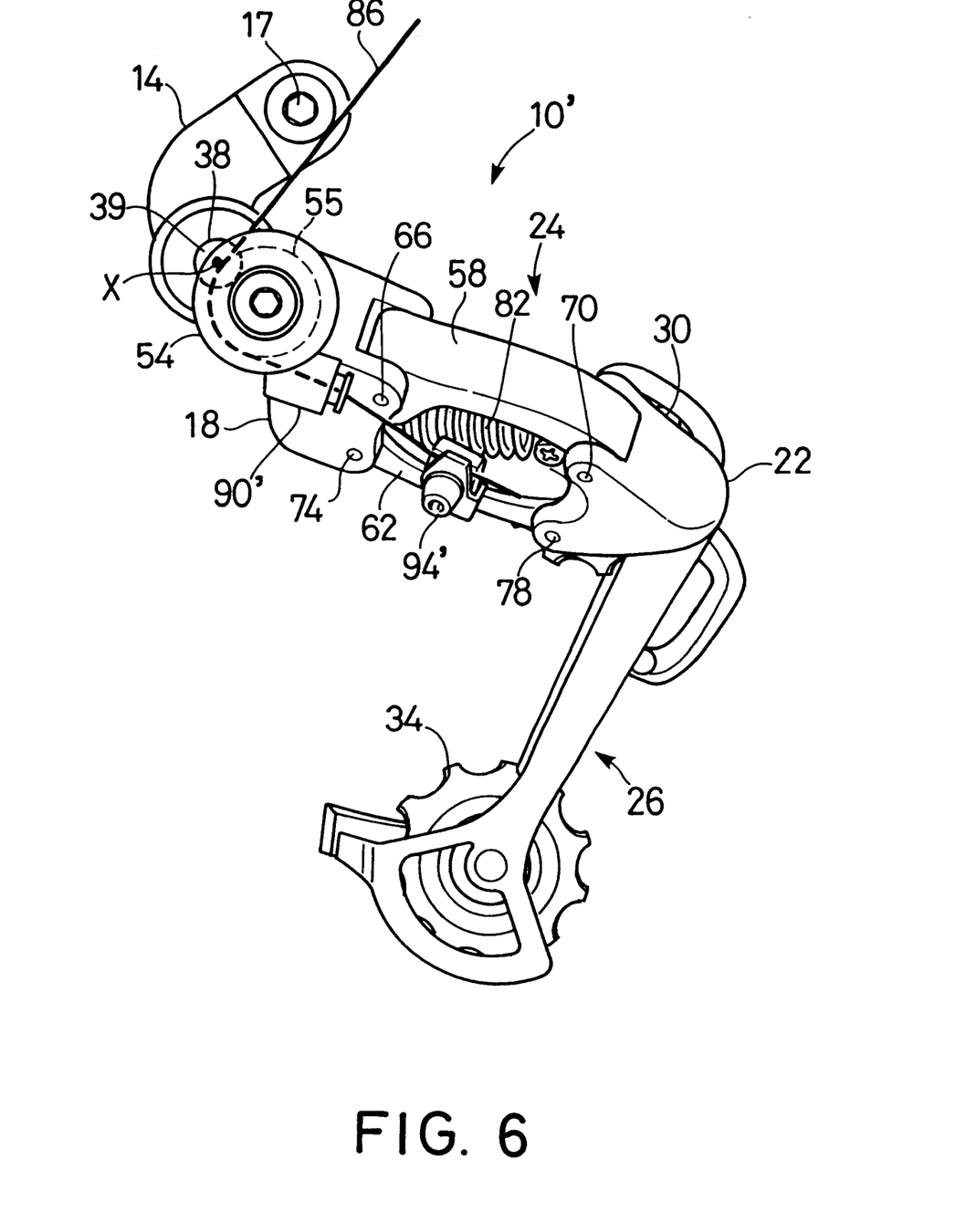
FIG. 6 is a laterally outer side view of an alternative embodiment of a rear derailleur according to the present invention.
Figure 7:
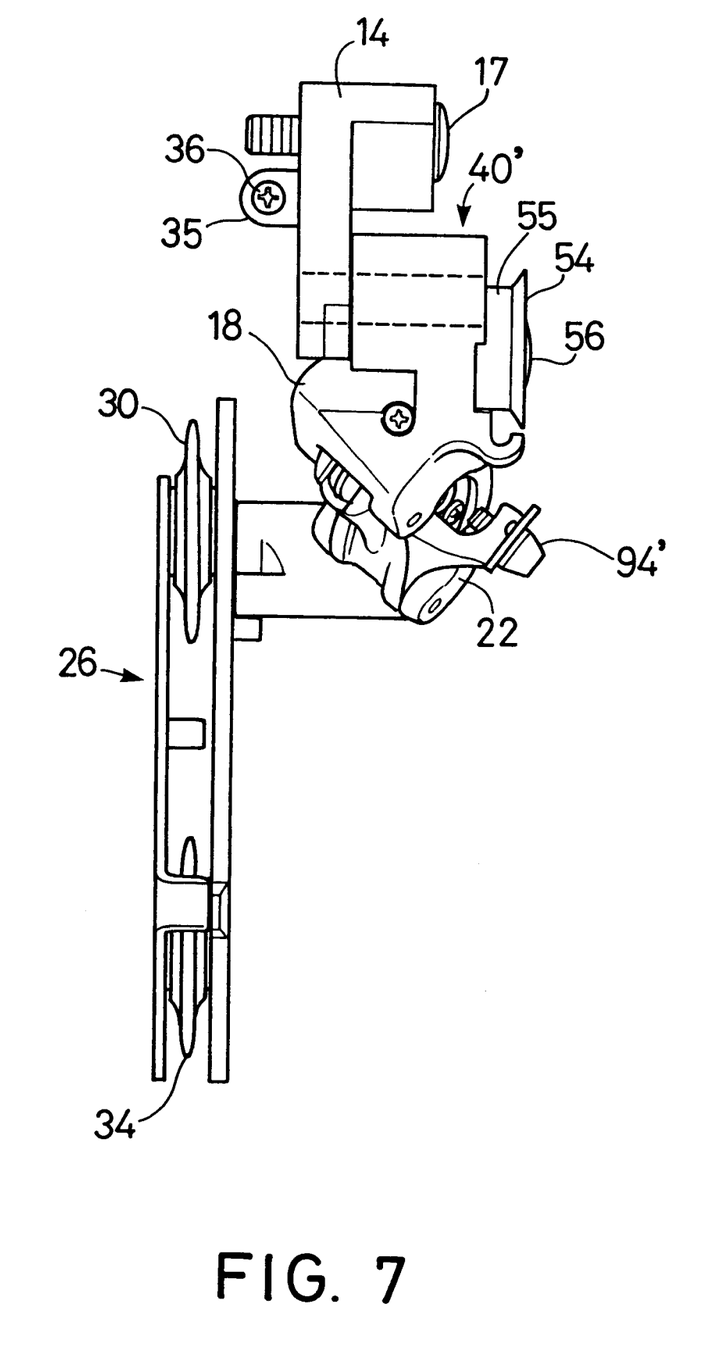
FIG. 7 is a rear view of the derailleur shown in FIG. 6.
Figure 8:
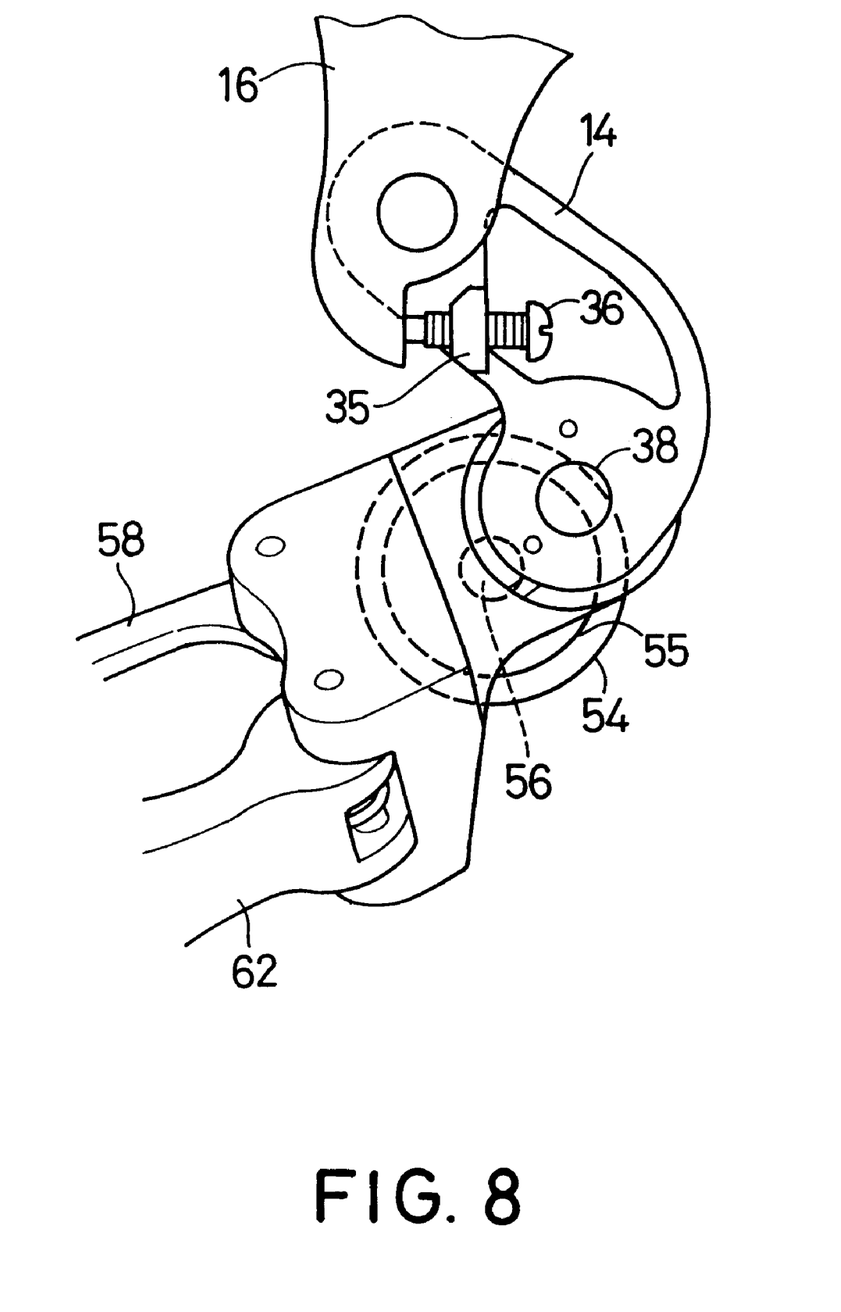
FIG. 8 is a laterally inner view of the base member and intermediate member of the derailleur shown in FIG. 6 showing an adjustment mechanism for adjusting a rotational position of the base member relative to the bicycle frame.

FIG. 6 is a laterally outer side view of a rear derailleur 10' according to another embodiment of the present invention, FIG. 7 is a rear view of derailleur 10', and FIG. 8 is a laterally inner view of the base member and intermediate member. This embodiment has substantially the same structures as the embodiment shown in FIGS. 1–4, so the identical structures are numbered the same. The differences in this embodiment are that cable guide roller 54 is rotatably mounted to intermediate member 18 rather than to base member 14; a cylindrical cable feed channel 90' is formed on an upper outer portion of intermediate member 18; wire 86 is fastened to a wire fixing member 94' disposed on a lower outer side of second link 62; and a spring retaining housing 40' is disposed on the outer side of base member 14 and extends laterally outward away from the rear wheel of the bicycle.

Figure 9A:
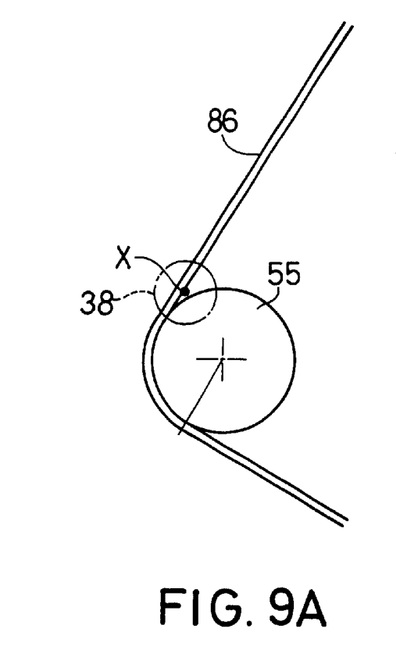
FIGS. 9A–9C illustrate the position of the inner wire of the control cable as the intermediate member pivots relative to the base member.
Figure 9B:
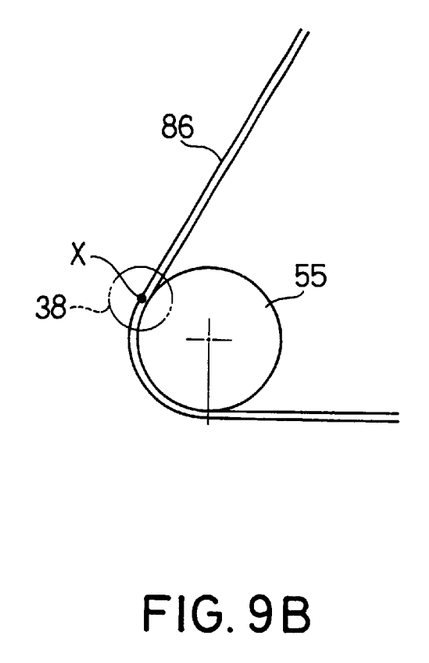
Figure 9C:
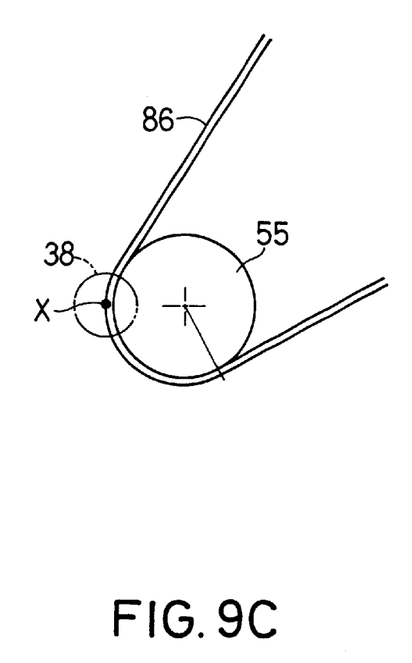

FIGS. 9A–9C illustrate the position of the control cable wire 86 as intermediate member 18 pivots relative to base member 14 in a counterclockwise direction. FIG. 9A shows the situation where the chain engages the smallest (innermost) front sprocket in a three-sprocket cluster and control cable wire 86 slightly intersects pivot axis X; FIG. 9B shows the situation wherein the chain engages the middle front sprocket and the center of control cable wire 86 intersects pivot axis X at the initial contact point between control cable wire 86 and cable guide surface 55; and FIG. 9C shows the situation where the chain engages the largest (outermost) front sprocket and control cable wire 86 continues to intersect pivot axis X. As in the first embodiment, as intermediate member 18 pivots relative to base member 14, wire 86 wraps around cable guide surface 55 to prevent a significant change in effective length of or tension on wire 86. This ensures that the alignment between chain guide 26 and the selected rear sprocket will not be adversely affected when the front derailleur shifts the chain to a different front sprocket. In tests conducted by the inventor, the effective length of wire 86 changed only 0.06 millimeter between the position shown in FIG. 9A and the position shown in FIG. 9B, and the effective length of wire 86 changed only 0.118 millimeter between the position shown in FIG. 9B and the position shown in FIG. 9C.

Figure 10:
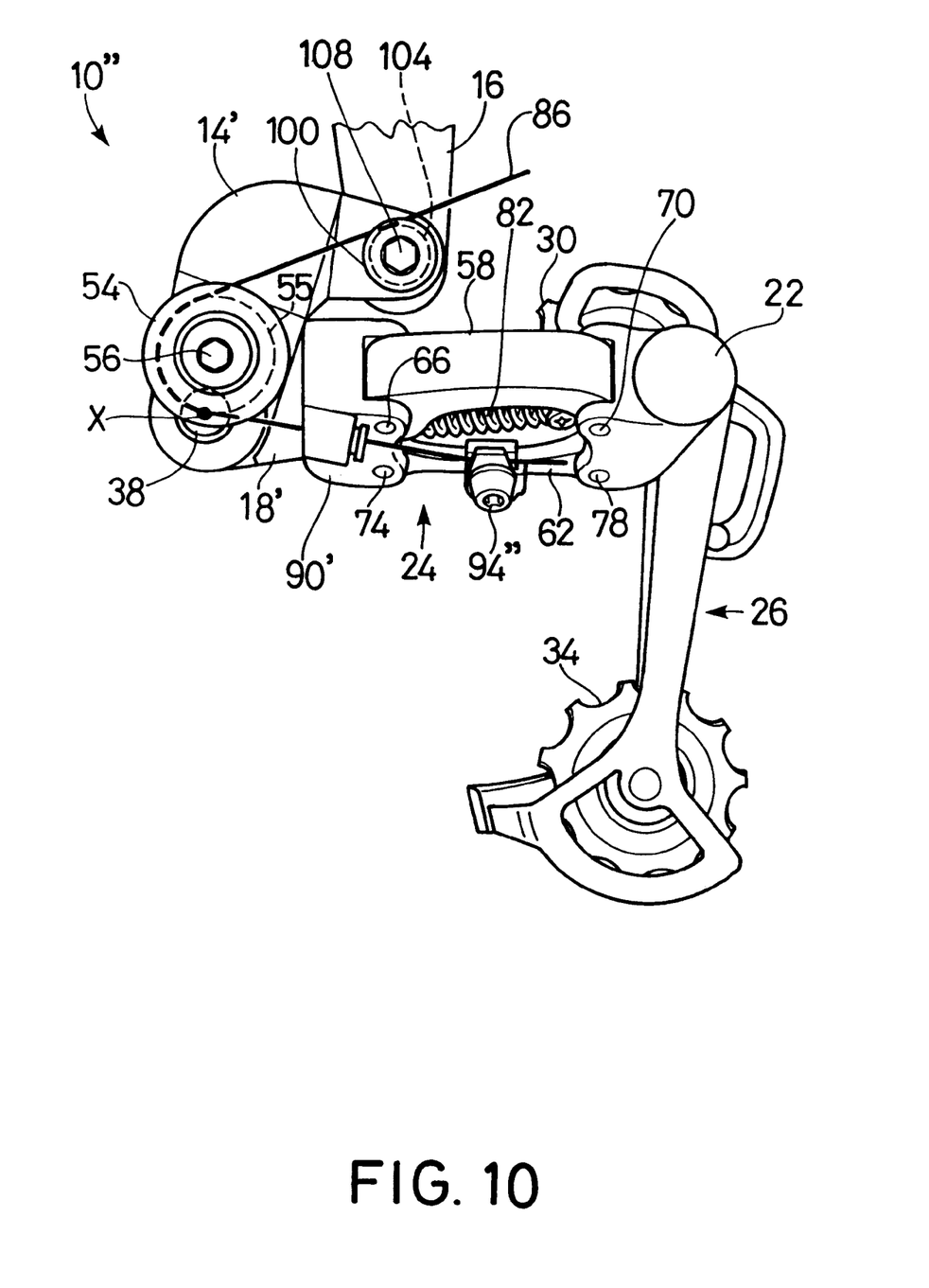
FIG. 10 is a laterally outer side view of another alternative embodiment of a rear derailleur according to the present invention.
Figure 11:
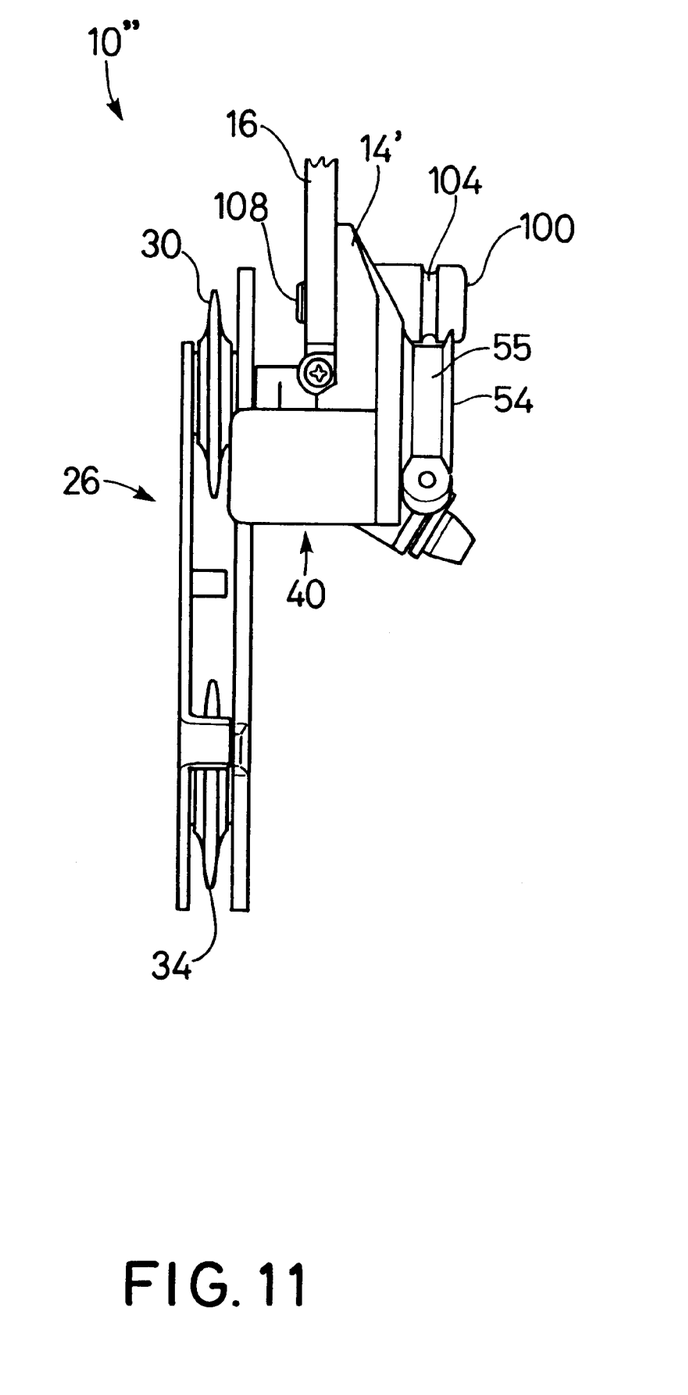
FIG. 11 is a rear view of the derailleur shown in FIG. 10.

FIG. 10 is a laterally outer side view of another alternative embodiment of a rear derailleur 10" according to the present invention, and FIG. 11 is a rear view of derailleur 10". This derailleur is substantially the same as derailleur 10 shown in FIGS. 1–4 except that a base member 14' extends in an L-shape downwardly from frame 14 so that pivot shaft 38 and cable guide roller 54 are disposed in a more rearward orientation relative to intermidiate member 18'; a cylindrical cable feed channel 90' is formed on an upper outer portion of intermediate member 18' (similar to the embodiment shown in FIG. 6); wire 86 is fastened to a wire fixing member 94" disposed on a lower outer side of second link 62 (again similar to the embodiment shown in FIG. 6); a spring retaining housing 40" is disposed below frame 16 such that frame 16 is aligned approximately midway along spring retaining housing 40" to make a more compact design; and a second cable guide roller 100 having a cable guide surface 104 is rotatably mounted to base member 14' coaxial with the bolt 108 that mounts base member 14' to frame 16. Operation is the same as derailleur 10 as shown in FIGS. 5A–5C. Derailleur 10" is better suited for bicycles that have the derailleur cable routed along the down tube of the frame, whereas derailleur 10 is better suited for bicycles that have the derailleur cable routed along the top tube of the bicycle.

While the above is a description of various embodiments of the present invention, further modifications may be employed without departing from the spirit and scope of the present invention. For example, the size, shape, location or orientation of the various components may be changed as desired. Return spring 82 could be connected for biasing movable member 22 laterally outward relative to intermediate member 18 (i.e., away from the rear wheel of the bicycle). Cable guide roller 54 need not be circular and may comprise a finite arc. Indeed, cable guide roller 54 may be replaced by a fixed cable guide having an arcuate or other-shaped cable guide surface. Base member may be one-piece with bicycle frame 16. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle derailleur assembly comprising:
   a base member:
   an intermediate member;
   wherein the intermediate member is coupled to the base member for pivoting relative to the base member around a pivot shaft defining a pivot area surrounding a pivot axis;
   a movable member supporting a chain guide;
   wherein the movable member is coupled for movement relative to the intermediate member; and
   a cable guide having a cable guide surface, wherein the cable guide surface intersect the pivot area when viewed in a direction along the pivot axis.

2. The derailleur assembly according to claim 1 wherein the intermediate member is coupled to the base member through the pivot shaft, and wherein the pivot shaft is concentric with the pivot axis.

3. The derailleur assembly according to claim 2 wherein the cable guide comprises a cable guide roller rotatably supported to the base member.

4. The derailleur assembly according to claim 3 further comprising a biasing mechanism for biasing the intermediate member relative to the base member.

5. A bicycle derailleur assembly comprising:
   base member:
   an intermediate member;
   wherein the intermediate member is coupled to the base member for pivoting relative to the base member around a pivot area surrounding a pivot axis;
   wherein the intermediate member is coupled to the base member through a pivot shaft, and wherein the pivot shaft is concentric with the pivot axis;
   a movable member supporting a chain guide;
   wherein the movable member is coupled for movement relative to the intermediate member;
   a cable guide having a cable guide surface, wherein the cable guide surface intersects the pivot area when viewed in a direction of the pivot axis
   wherein the cable guide comprises a cable guide roller rotatably supported to the base member;
   a biasing mechanism for biasing the intermediate member relative to the base member; and
   wherein the biasing mechanism comprises a spring having a first end retained to the base member and a second end retained to the intermediate member.

6. The derailleur assembly according to claim 2 wherein the cable guide comprises a cable guide roller rotatably supported to the intermediate member.

7. The derailleur assembly according to claim 6 further comprising a biasing mechanism for biasing the intermediate member relative to the base member.

8. The derailleur assembly according to claim 7 wherein the biasing mechanism comprises a spring having a first end retained to the base member and a second end retained to the intermediate member.

9. The derailleur assembly according to claim 2 further comprising a linkage mechanism coupling the movable member to the intermediate member.

10. The derailleur assembly according to claim 9 wherein the linkage mechanism comprises a first link pivotably coupled to the intermediate member and to the movable member.

11. The derailleur assembly according to claim 10 wherein the linkage mechanism comprises a second link pivotably coupled to the intermediate member and to the movable member.

12. The derailleur assembly according to claim 11 wherein the intermediate member, the movable member, the first link and the second link form a parallelogram linkage mechanism.

13. The derailleur assembly according to claim 11 further comprising an adjusting mechanism disposed on the base member for adjusting a rotational position of the base member relative to a bicycle frame portion.

14. The derailleur assembly according to claim 11 wherein the cable guide comprises a cable guide roller rotatably supported to the base member.

15. The derailleur assembly according to claim 14 further comprising a biasing mechanism for biasing the intermediate member relative to the base member.

16. A bicycle derailleur assembly comprising:
   a base member:
   an intermediate member;
   wherein the intermediate member is coupled to the base member for pivoting relative to the base member around a pivot area surrounding a pivot axis;
   wherein the intermediate member is coupled to the base member through a pivot shaft, and wherein the pivot shaft is concentric with the pivot axis;
   a movable member supporting a chain guide;
   wherein the movable member is coupled for movement relative to the intermediate member;
   a cable guide having a cable guide surface, wherein the cable guide surface intersects the pivot area when viewed in a direction of the pivot axis;
   wherein the cable guide comprises a cable guide roller rotatably supported to the base member;
   a linkage mechanism coupling the movable member to the intermediate member, wherein the linkage mechanism comprises:
      a first link pivotably coupled to the intermediate member and to the movable member; and
      a second link pivotably coupled to the intermediate member and to the movable member;
   a biasing mechanism for biasing the intermediate member relative to the base member; and
   wherein the biasing mechanism comprises a spring having a first end retained to the base member and a second end retained to the intermediate member.

17. The derailleur assembly according to claim 11 wherein the cable guide comprises a cable guide roller rotatably supported to the intermediate member.

18. The derailleur assembly according to claim 17 further comprising a biasing mechanism for biasing the intermediate member relative to the base member.

19. The derailleur assembly according to claim 18 wherein the biasing mechanism comprises a spring having a first end retained to the base member and a second end retained to the intermediate member.

20. The derailleur assembly according to claim 11 wherein the first link is disposed above the second link, and further comprising a cable fixing member disposed on an inner side of the second link.

21. The derailleur assembly according to claim 9 further comprising a return spring for biasing the movable member.

22. The derailleur assembly according to claim 21 wherein the return spring biases the movable member laterally inward.

23. The derailleur assembly according to claim 1 further comprising a cable feed channel disposed on the intermediate member.

24. The derailleur assembly according to claim 23 wherein the cable feed channel is disposed on an upper portion of the intermediate member.

25. The derailleur according to claim 24 wherein cable feed channel is disposed on a laterally inner portion of the intermediate member.

26. The derailleur according to claim 24 wherein the cable feed channel is disposed on a laterally outer portion of the intermediate member.

27. A bicycle derailleur assembly comprising:
   a base member:
   an intermediate member disposed on an inner lateral side of the base member;
   wherein the intermediate member is coupled to the base member for pivoting relative to the base member around a pivot shaft defining a pivot area surrounding a pivot axis, wherein the pivot shaft is disposed on the inner lateral side of the base member;
   a movable member supporting a chain guide;
   wherein the movable member is coupled for movement relative to the intermediate member; and
   a cable guide roller having a cable guide surface, wherein the cable guide surface is disposed on an outer lateral side of the base member that is opposite the inner lateral side.

28. A bicycle derailleur assembly for mounting to a base member disposed on a bicycle frame comprising:
   an intermediate member for mounting to the base member;
   a coupling for mounting the intermediate member to the base member so that the intermediate member pivots relative to the base member around a pivot area surrounding a pivot axis;
   a movable member supporting a chain guide;
   a coupling mechanism disposed between the intermediate member and the movable member so that the movable member moves relative to the intermediate member; and
   a rotatable cable guide having a cable guide surface, wherein the cable guide rotates around a cable guide axis that is disposed between the pivot area and the coupling mechanism; and
   wherein the pivot axis is substantially parallel to the cable guide axis.

29. A bicycle derailleur assembly for mounting to a base member disposed on a bicycle frame comprising:
   an intermediate member for mounting to the base member;
   a coupling for mounting the intermediate member to the base member so that the intermediate member pivots relative to the base member around a pivot shaft defining a pivot area surrounding a pivot axis;

a movable member supporting a chain guide;

a coupling mechanism disposed between the intermediate member and the movable member so that the movable member moves relative to the intermediate member; and a cable guide having a cable guide surface, wherein the cable guide surface intersects the pivot area when viewed in a direction along the pivot axis.

30. A bicycle derailleur assembly for mounting to a base member disposed on a bicycle frame comprising:

an intermediate member for mounting to the base member;

a coupling for mounting the intermediate member to the base member so that the intermediate member pivots relative to the base member around a pivot shaft defining a pivot area surrounding a pivot axis;

a movable member supporting a chain guide;

a coupling mechanism disposed between the intermediate member and the movable member so that the movable member moves relative to the intermediate member; and a rotatable cable guide having a cable guide surface, wherein the cable guide rotates around a cable guide axis that is disposed between the pivot area and the coupling mechanism; and wherein the cable guide surface intersects the pivot area when viewed in a direction along the pivot axis.

\* \* \* \* \*